United States Patent Office 3,652,645
Patented Mar. 28, 1972

3,652,645
HALOPHENOXY BENZOIC ACID HERBICIDES
Robert J. Theissen, Westfield, N.J., assignor to
Mobil Oil Corporation
No Drawing. Filed Apr. 25, 1969, Ser. No. 819,412
Int. Cl. C07c 79/46
U.S. Cl. 260—471 R          5 Claims

ABSTRACT OF THE DISCLOSURE 2-nitro-5-(halophenoxy)benzoic acids and esters, salts, amides, and acyl halides thereof comprise a class of compounds that are highly effective pre- and post-emergence herbicides.

BACKGROUND OF THE INVENTION

Field of the invention

This invention is concerned with certain phenoxybenzoic acid compounds and their use as herbicides.

Description of the prior art

It has been proposed to use as herbicides 2-methoxybenzoic acids (U.S. 3,013,054) and 4-phenoxybenzoic acids (French 1,502,538). It is the discovery of this invention, however, that benzoic acids having a phenoxy substituent in the 5-position are very effective herbicides.

SUMMARY OF THE INVENTION

This invention provides herbicidal compounds having the formula:

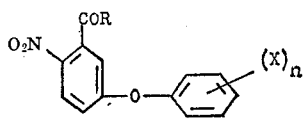

wherein X is halogen, $n$ is 1 to 5, and R is hydroxyl, alkoxy ($C_1$–$C_3$), aryloxy, chloro, amido, alkylamido ($C_1$–$C_3$), dialkylamido ($C_1$–$C_3$), or OM in which M is alkali metal (Li, Na, K), alkylammonium ($C_1$–$C_4$), or alkanolammonium ($C_1$–$C_3$).

DESCRIPTION OF SPECIFIC EMBODIMENTS

The compounds of this invention are readily prepared by the Ullman ether synthesis reaction between the alkali metal (Na, K) salt of a halophenol and a 5-halo(Cl, Br)-2-nitrobenzoic acid or an ester, amide, or salt thereof. The 5-halo-2-nitrobenzoic acid is readily prepared by nitrating an m-halotoluene, followed by oxidation of the methyl group by well-known procedures.

Non-limiting examples of the compounds of this invention are:

2-nitro-5-(2′,4′,6′-trichlorophenoxy)benzoic acid;
methyl 2-nitro-5-(2′,4′,6′-trichlorophenoxy)benzoate;
propyl 2-nitro-5-(2′,4′,6′-tribromophenoxy)benzoate;
phenyl 2-nitro-5-(2′,4′,5′-trifluorophenoxy)benzoate;
2-nitro-5-(2′,4′,6′-triiodophenoxy)benzoic acid;
2-nitro-5-(2′,4′,6′-trichlorophenoxy)benzoyl chloride;
2-nitro-5-(2′,4′,6′-trichlorophenoxy)benzamide;
N-ethyl 2-nitro-5-(2′,4′,6′-trichlorophenoxy)benzamide;
N-isopropyl 2-nitro-5-(2′,4′,6′-trichlorophenoxy)benzamide;
N,N-dimethyl 2-nitro-5-(2′,4′,6′-trichlorophenoxy)benzamide;
sodium(or potassium) 2-nitro-5-(2′,4′,6′-trichlorophenoxy)benzoate;
ethylammonium 2-nitro-5-(2′,4′,6′-trichlorophenoxy)benzoate;
ethanolammonium 2-nitro-5-(2′,4′,6′-trichlorophenoxy)benzoate;
sodium 2-nitro-5-(2′,4′,6′-trichlorophenoxy)benzoate;
methyl 2-nitro-5-(2′,4′,5′-trichlorophenoxy)benzoate;
methyl 2-nitro-5-(2′,4′-dichlorophenoxy)benzoate; and
methyl 2-nitro-5-(2′,3′,4′,5′,6′-pentachlorophenoxy)benzoate.

The following example illustrates the preparation of a typical compound of this invention and demonstrates a method for product recovery.

EXAMPLE 1

Methyl 2-nitro-5-(2′,4′,6′-trichlorophenoxy)benzoate

A stirred solution of methyl 5-chloro-2-nitrobenzoate (17.0 g., 0.079 mole) and the potassium salt of 2,4,6-trichlorophenol (18.6 g., 0.079 mole) in dimethyl sulfoxide (100 ml.) was heated at 90° for 17 hours. The cooled reaction mixture was diluted with water (500 ml.) and then extracted with ether (3× 100 ml.). The combined ether fractions were washed with 10% sodium hydroxide solution (2× 30 ml.) and then with a saturated aqueous sodium chloride solution. The ether solution was dried ($Na_2SO_4$) and the solvent evaporated to give a dark oil. Two crystallizations (petroleum ether) gave 1.91 g. of a pale yellow solid, M.P. 101–103°.

Example 1:

I.R. (Nujol): C=O 1723, C—O 1240, and 1260 cm$^{-1}$.
NMR (CDCl$_3$): methyl 3.91 p.p.m. (3H), quartet
6.96 p.p.m. (1H, J=2.5 and 8 c.p.s.), doublet
7.05 p.p.m. (1H, J=2.5 c.p.s.), broad singlet
7.05 p.p.m. (2H), and doublet 8.01 p.pm (1H, J=8 c.p.s.).

EXAMPLES 2 THROUGH 5

Using procedures similar to that described in Example 1, four other compounds within the scope of this invention were prepared. These compounds are:

(2) 2-nitro-5-(2′,4′,6′-trichlorophenoxy)benzoic acid.
(3) sodium 2-nitro-5-(2′,4′,6′-trichlorophenoxy)benzoate.
(4) methyl 2-nitro-5-(2′,4′,5′-trichlorophenoxy)benzoate.
(5) methyl 2-nitro-5-(2′,4′-dichlorophenoxy)benzoate.

COMPARATIVE EXAMPLES

A series of compounds were prepared which are position isomers of the compounds of Examples 1 through 4. Each compound is designated by the number of the corresponding isomeric compound of Examples 1 through 4, followed by "a" or "b". These compounds are:

(1a) methyl 3-nitro-6-(2′,4′,6′-trichlorophenoxy)benzoate.
(2a) 3-nitro-6-(2′,4′,6′-trichlorophenoxy)benzoic acid.
(2b) 4-nitro-6-(2′,4′,5′-trichlorophenoxy)benzoic acid.
(3a) sodium 3-nitro-6-(2′,4′,6′-trichlorophenoxy)benzoate.
(4a) methyl 3-nitro-6-(2′,4′,5′-trichlorophenoxy)benzoate.
(4b) methyl 4-nitro-6-(2′,4′,5′-trichlorophenoxy)benzoate.

The compounds of this invention can be applied in various ways to achieve herbicidal action. They can be applied, per se, as solids or in vaporized form, but are preferably applied as the toxic components in pesticidal compositions of the compound and a carrier. The compositions can be applied, as dusts; as liquid sprays, or as gas-propelled sprays and can contain, in addition to a carrier, additives such as emulsifying agents, binding agents, gases compressed to the liquid state, odorants, stabilizers, and the like. A wide variety of liquid and solid carriers can be used. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5. Non-limiting examples of liquid carriers, include water; organic solvents, such as alcohols, ketones, amides and esters; mineral oils, such as kerosene, light oils, and medium oils and vegetable oils, such as cottonseed oil.

In practice, herbicidal application is measured in terms of pounds of herbicide applied per acre. The compounds of this invention are effective herbicides when applied in herbicidal amounts, i.e., at rates between about 0.2 pound and about 10 pounds per acre.

HERBICIDAL EFFECTIVENESS

Method of propagating test species

Crabgrass: *Digitaria sanguinalis*
Yellow Foxtail grass: *Setaria glauca*
Johnson grass: *Sorgum Halepense*
Barnyard grass: *Echinochloa crus-galli*
Amaranth pigweed: *Amaranthus retroflexus*
Turnip: *Brassica sp.*
Cotton: *Gossypium hirsutum* var. DPL smooth leaf.
Corn: *Zea Mays* var. Golden Bantam
Bean: *Phaseolus vulgaris* var. Black Valentine All crop and weed species are planted individually in 3" plastic pots containing potting soil. Four seeds of each of corn, cotton, and snapbeans are seeded to a depth equal to the diameter of the seed. All other species are surface seeded and sprinkled with screened soil in an amount sufficient to cover the seeds. Immediately after planting, all pots are watered by sub-irrigation in greenhouse trays. Pots for the pre-emergence phase are seeded one day before treatment.

Planting dates for the post-emergence phase are varied so that all the seedlings will reach the desired stage of development simultaneously. The proper stage of seedling development for treatment in the post-emergence phase is as follows:

Grasses: 2 inches in height.
Pigweed and turnips: 1 or 2 true leaves visible above cotyledons.
Cotton: first true leaf 1 inch in length; expanded cotyledons.
Corn: 3 inches–4 inches in height.
Beans: primary leaves expanded, growing point at primary leaf node.

Method of treatment

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened initially at a rate of application equivalent to four pounds per acre. Two weeks after treatment the pre- and post-emergence percent injury is visually rated. Subsequent testing was carried out at 2.1 and 0.5 pounds per acre.

Herbicidal testing of the compounds of Examples 1 through 5 and of the comparative compounds showed the results set forth in Table I. The plants are tableted using the following abbreviations:

Crabgrass: CG    Pigweed: PW
Yellow Foxtail grass: YF    Turnip: TP
Johnson grass: JG    Cotton: CT
Barnyard grass: BG    Corn: CN
Bean: BN

TABLE I.—PRE/POST EMERGENCE

| Example No. | Compound dosage, lbs./acre | CG | YF | JG | BG | PW | TP | CT | CN | BN |
|---|---|---|---|---|---|---|---|---|---|---|
| 1 | 4 | 100/100 | 100/100 | 60/50 | 60/70 | 100/100 | 80/100 | 0/100 | 0/40 | 30/100 |
|   | 2 | 100/100 | 80/100 | 30/70 | 20/80 | 100/100 | 0/100 | 90/100 | 30/20 | 70/100 |
|   | 1 | 100/90 | 80/100 | 20/60 | 0/60 | 100/100 | 30/90 | 0/100 | 0/20 | 80/100 |
|   | 0.5 | 40/50 | 60/80 | 30/60 | 0/40 | 100/70 | 0/80 | 40/20 | 0/20 | 30/70 |
| 1a | 4 | 20/20 | 0/20 | 0/20 | 0/20 | 20/0 | 0/30 | 100/0 | 50/0 | 20/80 |
| 2b | 4 | 0/30 | 40/0 | 50/30 | 20/20 | 20/20 | 0/50 | 40/20 | 30/30 | 80/0 |
| 2 | 4 | 70/70 | —/— | 70/90 | 60/70 | —/— | 100/100 | 0/100 | 0/70 | 80/70 |
| 2a | 4 | 20/30 | 0/20 | 20/30 | 0/20 | —/20 | 30/90 | 50/20 | 0/0 | 50/70 |
| 3 | 4 | 50/80 | —/— | 30/60 | 40/60 | —/— | 95/100 | 50/100 | 0/40 | 50/100 |
| 3a | 4 | 0/20 | 0/20 | 0/20 | 0/20 | 50/50 | 0/60 | 100/0 | 30/0 | 50/40 |
| 4 | 4 | 90/60 | —/— | 80/90 | 50/50 | —/— | 40/70 | 80/70 | 0/50 | 80/80 |
| 4b | 8 | 30/30 | 0/20 | 20/30 | 0/20 | 30/30 | 40/0 | 0/30 | 0/0 | 60/0 |
| 4a | 4 | 20/20 | 0/20 | 0/20 | 0/20 | 0/20 | 0/60 | 30/50 | 0/30 | 0/60 |
| 5 | 4 | 100/95 | —/— | 90/90 | 90/90 | —/— | 80/100 | 50/80 | 0/40 | 50/100 |

Although the present invention has been described with preferred embodiments, it is to be understood that modifications and varations may be resorted to, without departing from the spirit and scope of this invention, as those skilled in the art will readily understand. Such variations and modifications are considered to be within the purview and scope of the appended claims.

What is claimed is:

1. Herbicidal compounds having the formula:

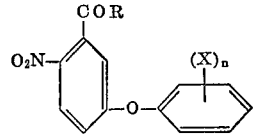

wherein X is halogen, n is 1 to 5, and R is hydroxyl, alkoxy ($C_1$–$C_3$), and phenoxy.

2. A compound of claim 1, wherein R is methoxy, n is 3, and X is chlorine in the 2',4',6'-positions.

3. A compound of claim 1, wherein R is hydroxyl, n is 3, and X is chlorine in the 2',4',6'-positions.

4. A compound of claim 1, wherein R is methoxy, n is 2, and X is chlorine in the 2',4'-positions.

5. A compound of claim 1, wherein R is methoxy, n is 3, and X is chlorine in the 2',4',5'-positions.

References Cited

UNITED STATES PATENTS 3,013,053    12/1961    Richter    260—471 R

LORRAINE A. WEINBERGER, Primary Examiner

L. A. THAXTON, Assistant Examiner

U.S. Cl. X.R.

71—111, 115, 118; 260—520, 544 M, 559 R

REEXAMINATION CERTIFICATE (223rd)

United States Patent [19]

Theissen

[11] B1 3,652,645

[45] Certificate Issued Jul. 24, 1984

[54] HALOPHENOXY BENZOIC ACID HERBICIDES

[75] Inventor: Robert J. Theissen, Westfield, N.J.

[73] Assignee: Rhone-Poulenc Agrochemie, Lyon, France

Reexamination Request:
No. 90/000,280, Oct. 28, 1982

Reexamination Certificate for:
Patent No.: 3,652,645
Issued: Mar. 28, 1972
Appl. No.: 819,412
Filed: Apr. 25, 1969

[51] Int. Cl.³ .............................................. C07C 79/46
[52] U.S. Cl. ...................................... 560/21; 562/435
[58] Field of Search ........................... 560/21; 562/435

[56] References Cited

U.S. PATENT DOCUMENTS 3,316,080   4/1967   Inoue et al. ............................ 71/2.3

OTHER PUBLICATIONS

Fults, et al., "A Biometric Evaluation of the Growth-Regulating and Herbicidal Properties of Some Organic Compounds", *Journal of American Society of Agronomy*, 1947, pp. 667–681.

*Primary Examiner*—Paul J. Killos

[57] ABSTRACT

2-nitro-5-(halophenoxy)benzoic acids and esters, salts, amides, and acyl halides thereof comprise a class of compounds that are highly effective pre- and post-emergence herbicides.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-5 is confirmed.

* * * * *